Jan. 7, 1958     R. F. HOWE     2,818,599
POULTRY EVISCERATOR
Filed April 23, 1956     3 Sheets-Sheet 1
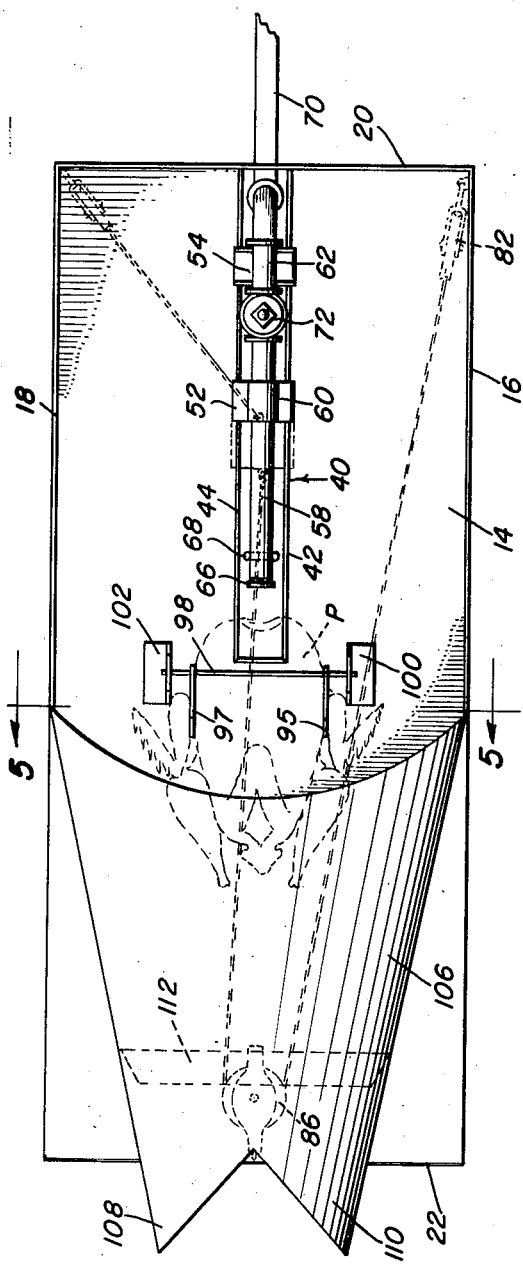
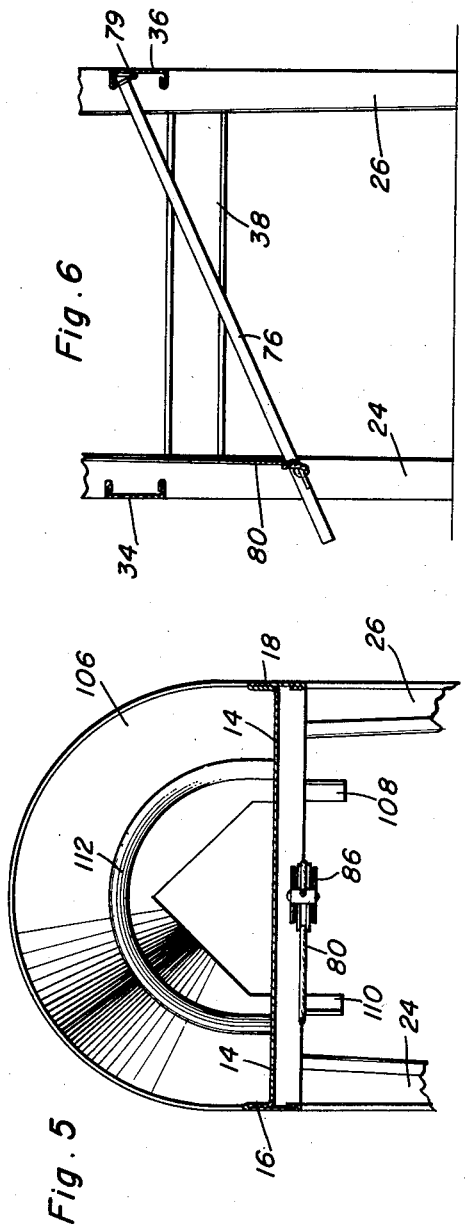
Russell F. Howe
INVENTOR.

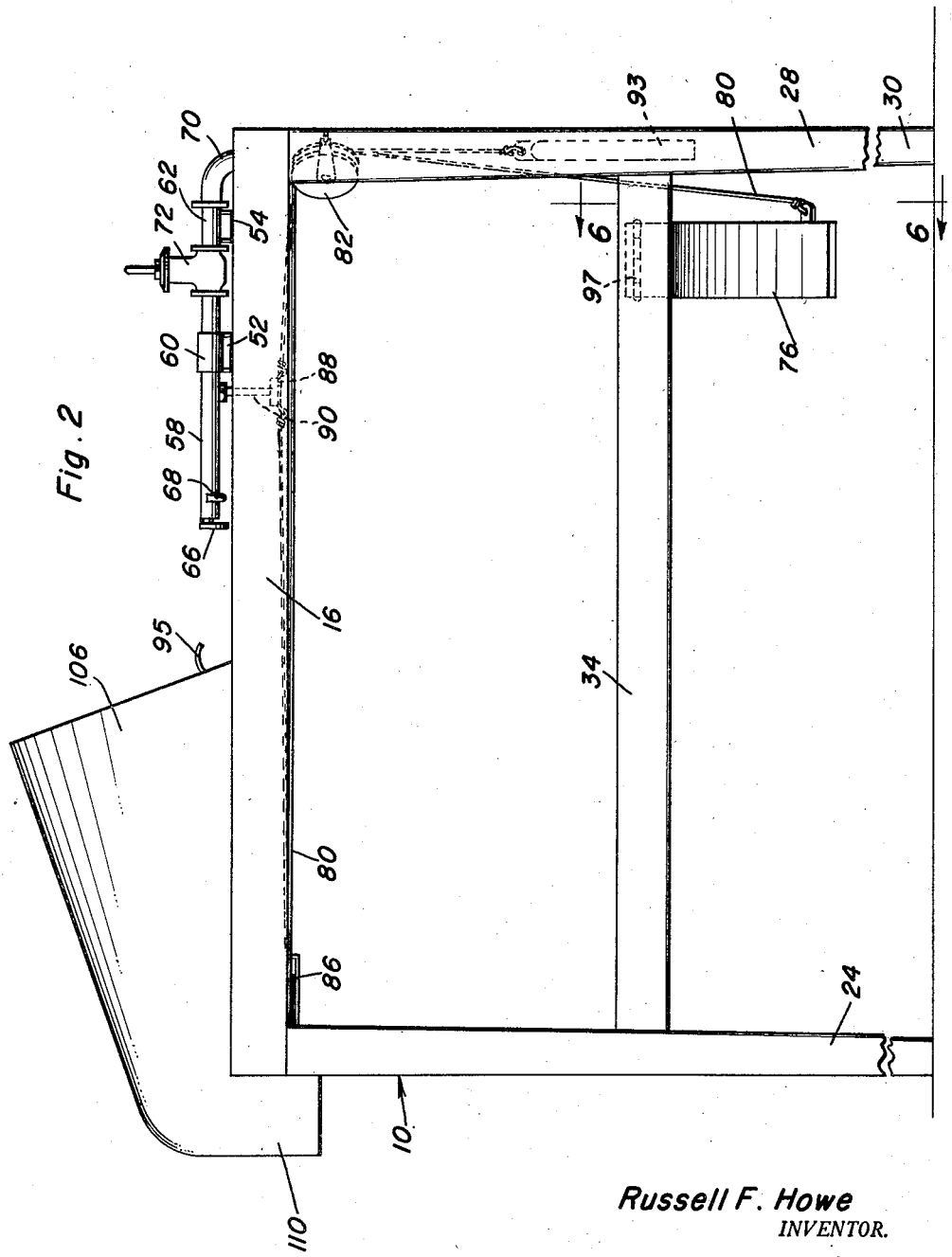

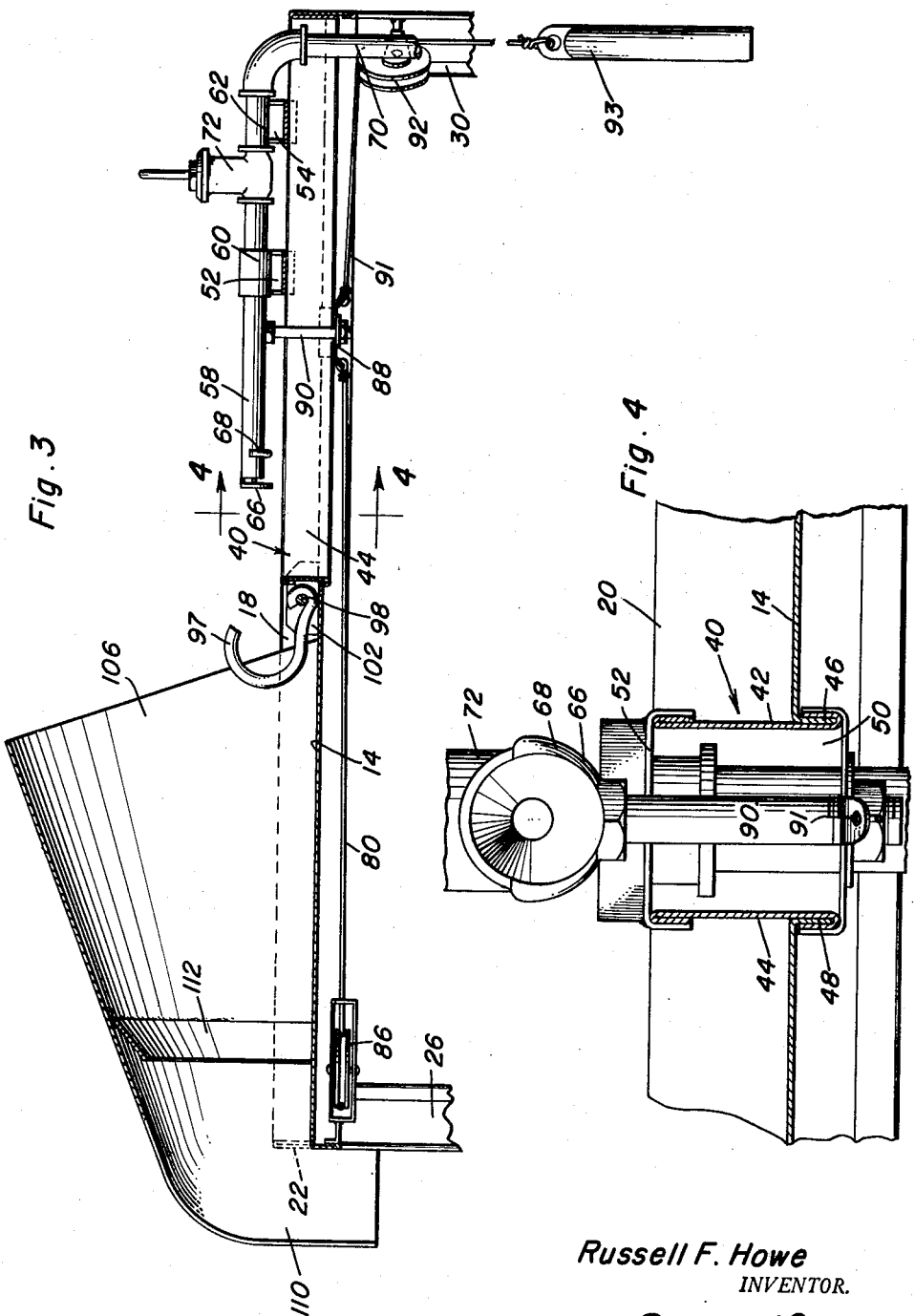

United States Patent Office 2,818,599
Patented Jan. 7, 1958

2,818,599

POULTRY EVISCERATOR

Russell F. Howe, Eagle, Mich.

Application April 23, 1956, Serial No. 580,004

8 Claims. (Cl. 17—11)

This invention relates to improvements in poultry eviscerating equipment and particularly to an improved apparatus whereby the poultry is eviscerated and cleaned simultaneously.

An object of the present invention is to ease the task of eviscerating poultry by providing means to support the poultry in such position that the entrails, gizzard, liver, heart and lungs are washed out of the poultry simultaneously under a considerable, but regulated pressure in a stream of water. In this way, the separate operations in eviscerating the bird are eliminated entirely inasmuch as the interior of the bird is automatically washed.

A further object of the invention is to provide a table on which poultry may be very quickly and securely fastened by hooking them behind the wings, the poultry support means being arranged so that a nozzle that moves longitudinally of the table may be easily inserted into a cavity in the poultry whereby the stream of water may be directed through the poultry and the innards of the poultry together with a stream of water directed downwardly to a refuse pail or other means of disposing of the refuse.

A further object of the invention is to provide a practical device for eviscerating poultry which is of very simple construction and which may be easily maintained in a cleanly condition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the eviscerator which exemplifies the principles of the invention, showing a typical animal in place;

Figure 2 is a side view of the structure in Figure 1;

Figure 3 is a fragmentary longitudinal sectional view of the poultry eviscerator of Figure 1 and taken approximately along a longitudinal center-line thereon;

Figure 4 is a fragmentary and enlarged transverse sectional view taken approximately on the line 4—4 of Figure 3 and in the direction of the arrows;

Figure 5 is a fragmentary transverse sectional view taken approximately on the line 5—5 of Figure 1; and Figure 6 is a fragmentary sectional view taken approximately on the line 6—6 of Figure 2.

In the accompanying drawings I have illustrated a preferred embodiment of my invention. It is to be understood that the eviscerator shown in the drawings merely exemplifies the principles of the invention and that reasonable variations may be made without departing from the spirit of this invention. The illustrated form consists of a table 10 that includes a table top 14 having an upper surface and made of suitable non-rusting material, such as stainless steel or heavily plated sheet iron or even some forms of commercially available plastic. An upwardly extending pair of sides 16 and 18 are on the longer edges of the substantially rectangular table top 14, while the shorter ends 20 and 22 are attached to the shorter edges of the table top 14. The table is supported by a suitable leg structure, for example, four legs 24 and 26 at the far end of the table and legs 28 and 30 at the opposite end of the table. These legs are welded or otherwise rigidly fastened to the table top and have inwardly opening channels 34 and 36 supporting the side legs and inwardly opening channels 38 extending across the end legs. This forms a firm foundation and base for the table.

An upwardly rising track 40 is on the table top 14, being built in it (Fig. 4). This track consists of a pair of rails 42 and 44 connected by seams 46 and 48 to downwardly extending parallel flanges that are on the sides of a central longitudinal opening 50 in the table top 14. The upper edges of the rails 42 and 44 are rolled so that the U-shaped slides 52 and 54 may be easily movable thereon. These slides are joined to a nozzle 58 and are mounted in a horizontal position above the surface of the table top 14. Upwardly extending brackets 60 and 62 on the slides 52 and 54 embrace and are attached to the nozzle 58 whose forward end has guards 66 and 68 attached to it.

Nozzle 58 is attached to a conduit 70, the latter being connected with a source of water under considerable pressure, this pressure being varied by manually adjusting a pressure regulating valve (not shown) in the conduit 70 and between the nozzle 58 and the source of liquid under pressure. This pressure may be augmented by applying compressed air to the liquid as it issues through the conduit 70 to the nozzle 58. A manually operable valve 72 is attached to the nozzle 58 between it and the conduit 70. Therefore, the flow of liquid through nozzle 58 may be manually controlled in accordance with the desire of the operator of the eviscerator.

The nozzle is adapted to slide back and forth on the track 40. This is accomplished by actuation of slide moving means that include a foot pedal 76 which is hinged as at 79 to the channel 36 (Fig. 6). A rope or cable 80 is secured to the foot pedal 76, which is a lever mounted in a low position, this cable being entrained over pulley 82 in one corner of the table and below the upper surface thereof. This cable extends through a front pulley 86 that is suspended beneath the table top 14 and terminates in a connection with a slide 88 that is attached by means of bolt 90 to the nozzle 58. This bolt passes through the open center of the track 40 and imparts the necessary force to the nozzle in order to slide it forward. The forward sliding movement of the nozzle 58 is opposed by means of a cable 91 that is also attached to slide 88. This cable is entrained over a pulley 92 carried below the table top 14 and has a counterweight 93 at the end thereof. Therefore, the counterweight functions as a return for the nozzle 58.

Means to support the poultry P in an operative position on the table top are secured to the table top. These means comprise a pair of hooks 95 and 97 whose bills face the nozzle 58 and whose opposite ends are mounted pivotally on a spindle 98. This spindle is carried by its ends on upwardly projecting mounting brackets 100 and 102 that are spot welded or otherwise fixed to the top surface of the top 14 of the eviscerator.

Means for directing the flow of liquid after passing through the poultry are carried on the table. These means comprise a hood 106 that is smoothly curved in cross-section and that opens toward the nozzle 58. The side walls of the hood 106 taper inwardly and downwardly as they approach the discharge ends 108 and 110, respectively, which are directed downwardly of the table. An intermediate collar 112 functions as an additional baffle for the liquid and also for structural support of the hood 106. The ends of the collar are welded or otherwise fixed to the table top 14.

In use, the operator removes the neck, and crop, and cuts around the vent. Laying the poultry on its back and hooking its wings in the hooks on the table, he then steps on the foot pedal and this moves the nozzle into the opening left by the removal of the neck. He operates the valve 72 and the force of the water washes the entrails, gizzard, liver, heart, and lungs out of the poultry P, leaving it entirely clean inside. The liquid issues through the vent opening as directed by the hood 106 to refuse collection means (not shown) at the end of the table. This reduces a great deal of the labor involved in eviscerating the poultry, and eliminates entirely the separate operating of washing the bird on the inside after evisceration.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed is:

1. As a new article of manufacture, a poultry eviscerating device comprising a table having a top, sides on said top extending upwardly thereof, a track on said table, a nozzle, means including a slide mounting said nozzle for sliding movement on said track, said track extending longitudinally of said table, means carried by said table to support poultry in advance of said track and nozzle so that upon movement of the nozzle the discharge end thereof moves into the poultry, means connected to said slide to move said slide and said nozzle on said track so that said nozzle may be so moved into the poultry, a conduit connected to said nozzle, and a valve in said conduit to regulate the passage of liquid through said nozzle and the poultry at the discharge end thereof.

2. As a new article of manufacture, a poultry eviscerating device comprising a table having a top, sides on said top extending upwardly thereof, a horizontal track on said table, a nozzle means including a slide mounting said nozzle for sliding movement on said track, said track extending longitudinally of said table, means to support a poultry that has neck and crop openings in advance of said track and nozzle so that upon movement of the nozzle the discharge end thereof moves into the neck opening of the poultry, means moving said slide and said nozzle on said track so that said nozzle enters the neck opening of the poultry, an upwardly rising hood on said table and in horizontal alignment with said nozzle, and said hood having a part directed so as to discharge the liquid which passes through the poultry and innards of the poultry into a single location for easy collection.

3. The combination of claim 2 wherein said means for supporting the poultry includes a pair of hooks adapted to connect behind the wings of the poultry, brackets, and means mounting said hooks on said brackets for swinging movement in advance of the nozzle.

4. A poultry eviscerator comprising a table having an upper surface, an upwardly extending horizontal track carried by said table and rising above the upper surface of the table, means including a pair of hooks located above the upper surface of said table and in approximate horizontal alignment with said track for holding poultry that has neck and crop openings in approximate horizontal alignment with said track, a slide carried by said track and adapted to move toward and away from said poultry holding means, a nozzle arranged with axis approximately horizontal and carried by said slide for movement with said slide, means connected to said nozzle to conduct water under pressure thereto and including a valve for the control of water under pressure so that when said slide is moved to such position that the nozzle enters one of the openings of the poultry the valve may be opened to discharge water from the nozzle into one of said openings of the poultry in order to propel cleaning water and the viscera through the other opening of the poultry and in an approximately horizontal direction above the surface of said table, and a hood connected to said table and rising upwardly therefrom, said hood having walls which converge toward the discharge end thereof in order to direct the water propelled viscera to a common discharge point and thereby facilitate collection thereof.

5. The eviscerator of claim 4 wherein there are slide moving means which include a foot pedal to enable the operator of the eviscerator to have both hands free, flexible means connecting to said foot pedal and said slide, and means also connected to said slide for returning said slide after said slide has been actuated in one direction by depression of said foot pedal.

6. The eviscerator of claim 4 and said hood having an open front adjacent to and within which at least a part of said means for holding the poultry are located, a water and viscera deflecting baffle disposed in said hood intermediate the open front end and the discharge end thereof, and said baffle being inclined and secured to said hood in order to structurally support the hood.

7. A poultry eviscerating machine comprising a table, a leg structure constituting a part of said table, a table top supported by said leg structure, a longitudinal and horizontally disposed track carried by said table top and arranged in a fixed position with respect thereto, a movable slide carried by said track, a nozzle attached to said slide and having a longitudinal axis which is approximately horizontal and coincident with the discharge axis of the nozzle, means for conducting water under pressure to the nozzle for issue therethrough, means carried by said table top to support poultry with crop and neck openings in approximate horizontal alignment with said axis, means connected to said slide and carried by said table for moving said slide and the nozzle thereon horizontally toward said poultry support means and into one of said openings of said poultry so that the water issuing from said nozzle under pressure propels the viscera through the other of said openings of said poultry and at the same time washes the interior cavity of the poultry.

8. A poultry eviscerating machine comprising a table, a leg structure constiuting a part of said table, a table top supported by said leg structure, a longitudinal and horizontally disposed track carried by said table top and arranged in a fixed position with respect thereto, a moveable slide carried by said track, a nozzle attached to said slide and having a longitudinal axis which is approximately horizontal and coincident with the discharge axis of the nozzle, means for conducting water under pressure to the nozzle for issue therethrough, means carried by said table top to support poultry with crop and neck openings in approximate horizontal alignment with said axis, means connected to said slide and carried by said table for moving said slide and the nozzle thereon horizontally toward said poultry support means and into one of said openings of said poultry so that the water issuing from said nozzle under pressure propels the viscera through the other of said openings of said poultry and at the same time washes the interior cavity of the poultry, and a hood having an entrance end and a discharge end, said hood secured to said table with said ends thereof in horizontal alignment with said nozzle so that the water and viscera which are expelled from the poultry are directed by said hood.

References Cited in the file of this patent

UNITED STATES PATENTS

| | | |
|---|---|---|
| 1,828,725 | Muller et al. | Oct. 20, 1931 |
| 1,900,267 | Youman | Mar. 7, 1933 |
| 2,613,391 | Still | Oct. 14, 1952 |
| 2,723,421 | Smith et al. | Nov. 15, 1955 |